United States Patent
Gomes et al.

(10) Patent No.: US 10,817,251 B2
(45) Date of Patent: *Oct. 27, 2020

(54) DYNAMIC CAPABILITY DEMONSTRATION IN WEARABLE AUDIO DEVICE

(71) Applicant: Bose Corporation, Framingham, MA (US)

(72) Inventors: Rodrigo Sartorio Gomes, Natick, MA (US); Ricardo Federico Carreras, Southborough, MA (US); Daniel James Buckley, Newton, MA (US)

(73) Assignee: BOSE CORPORATION, Framingham, MA (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/204,339

(22) Filed: Nov. 29, 2018

(65) Prior Publication Data

US 2020/0174734 A1  Jun. 4, 2020

(51) Int. Cl.
| | |
|---|---|
| *G10K 11/178* | (2006.01) |
| *G06F 3/16* | (2006.01) |
| *H04R 1/10* | (2006.01) |
| *G10L 25/84* | (2013.01) |

(52) U.S. Cl.
CPC ........ *G06F 3/165* (2013.01); *G10K 11/17823* (2018.01); *G10K 11/17853* (2018.01); *G10L 25/84* (2013.01); *H04R 1/1041* (2013.01); *G10K 2210/1081* (2013.01); *G10K 2210/3028* (2013.01)

(58) Field of Classification Search
CPC ..... G06F 3/165; G06F 40/35; G08B 21/0275; G10L 25/84; G10K 11/178; G10K 11/1783; H04R 1/1041

USPC .................... 381/71.6, 58, 56, 123
See application file for complete search history.

(56) References Cited

U.S. PATENT DOCUMENTS

| | | | |
|---|---|---|---|
| 8,010,366 B1 | 8/2011 | Kearby et al. | |
| 9,149,214 B2 | 10/2015 | Adachi et al. | |
| 2004/0030556 A1 | 2/2004 | Bennett | |
| 2005/0248717 A1 | 11/2005 | Howell et al. | |
| 2009/0085873 A1* | 4/2009 | Betts .................. | G08B 21/0275 345/169 |
| 2012/0173187 A1 | 7/2012 | Lee et al. | |
| 2012/0209601 A1 | 8/2012 | Jing | |
| 2013/0108994 A1 | 5/2013 | Srinivasa et al. | |
| 2013/0300648 A1 | 11/2013 | Kim et al. | |

(Continued)

OTHER PUBLICATIONS

Bragi Dash Pro website with link to demonstration video, available at: https://bragi.com/products/thedashpro (accessed on Nov. 29, 2018).

(Continued)

*Primary Examiner* — Paul Kim
*Assistant Examiner* — Ubachukwu A Odunukwe
(74) *Attorney, Agent, or Firm* — Hoffman Warnick LLC

(57) ABSTRACT

Various implementations include approaches for dynamically demonstrating device capabilities in a wearable audio device based upon detected environmental conditions. In certain cases, these approaches include initiating a demonstration using the wearable audio device to provide the user with an example of the device capabilities, based upon detected environmental conditions proximate the wearable audio device and/or a biometric state of the device user.

25 Claims, 3 Drawing Sheets

(56) References Cited

U.S. PATENT DOCUMENTS

| | | |
|---|---|---|
| 2014/0081631 A1 | 3/2014 | Zhu et al. |
| 2015/0248879 A1 | 9/2015 | Miskimen et al. |
| 2015/0281853 A1 | 10/2015 | Eisner et al. |
| 2015/0317125 A1* | 11/2015 | Jones .............. G05B 15/02 700/94 |
| 2016/0112817 A1 | 4/2016 | Fan et al. |
| 2016/0189565 A1 | 6/2016 | Rot et al. |
| 2016/0210872 A1 | 7/2016 | Roberts et al. |
| 2016/0301807 A1 | 10/2016 | Webb et al. |
| 2016/0381453 A1 | 12/2016 | Ushakov |
| 2017/0076738 A1 | 3/2017 | Freudenthal et al. |
| 2017/0099380 A1 | 4/2017 | Lee |
| 2018/0035216 A1 | 2/2018 | Van Hasselt et al. |
| 2019/0035397 A1* | 1/2019 | Reily .............. G06F 40/35 |

OTHER PUBLICATIONS

Dash Pro Showreel, available at: https://www.youtube.com/watch?v=jH9likHtoTA (accessed on Nov. 29, 2018).

Starkey Sound Demo website, available at: https://www.starkey.com/sound-demo/st/en/index.html#page/4 (accessed on Nov. 29, 2018).

U.S. Appl. No. 16/204,375 Office Action dated May 11, 2020, 15 pages.

U.S. Appl. No. 16/274,648, Office Action dated Apr. 7, 2020, 13 pages.

\* cited by examiner

DYNAMIC CAPABILITY DEMONSTRATION IN WEARABLE AUDIO DEVICE

TECHNICAL FIELD

This disclosure generally relates to audio devices. More particularly, the disclosure relates to dynamically demonstrating capabilities of wearable audio devices.

BACKGROUND

Modern wearable audio devices include various capabilities that can enhance the user experience. However, many of these capabilities go unrealized or under-utilized by the user due to inexperience with the device functions and/or lack of knowledge of the device capabilities.

SUMMARY

All examples and features mentioned below can be combined in any technically possible way.

Various implementations include approaches for dynamically demonstrating device capabilities in a wearable audio device based upon detected environmental conditions and/or a biometric state of the user. In certain cases, these approaches include initiating a demonstration using the wearable audio device to provide the user with an example of the device capabilities, based upon detected environmental conditions proximate the wearable audio device and/or a detected biometric state of the user.

In some particular aspects, a wearable audio device includes: an acoustic transducer having a sound-radiating surface for providing an audio output; and a control system coupled with the acoustic transducer and a sensor system, the control system configured to: receive data about at least one of: an environmental condition proximate the wearable audio device or a biometric state of a user from the sensor system; detect availability of a demonstration mode at the wearable audio system based upon the data about the environmental condition and/or the biometric state, and demonstration mode settings; provide a user prompt to initiate the demonstration mode at the wearable audio device; and initiate the demonstration mode in response to actuation of the user prompt at the wearable audio device or another device.

In other particular aspects, a computer-implemented method includes: receiving data about at least one of: an environmental condition proximate a wearable audio device or a biometric state of a user from a sensor system; detecting availability of a demonstration mode at the wearable audio device based upon the data about the environmental condition and/or the biometric state of the user, and demonstration mode settings for the wearable audio device; providing a user prompt to initiate the demonstration mode at the wearable audio device; and initiating the demonstration mode in response to actuation of the user prompt at the wearable audio device or another device.

Implementations may include one of the following features, or any combination thereof.

In certain cases, the demonstration mode settings include capabilities listings for each of a plurality of acoustic features of the wearable audio device.

In particular aspects, the sensor system includes a location tracking system, the environmental condition includes a location of the wearable audio device, and the location includes at least one of: a proximity to a location of interest, movement between locations, a proximity to another audio device in a network of audio devices, or a proximity to a smart device associated with a user distinct from a user of the wearable audio device.

In some implementations, the control system is coupled with a smart device having access to a user profile about a user, where the control system is further configured to detect availability of the demonstration mode at the wearable audio device based upon the user profile.

In certain aspects, the sensor system includes a position tracking system, where the environmental condition includes a position of the sensor system.

In particular cases, the position tracking system includes a head tracking system or a body tracking system for detecting at least one of acceleration, deceleration, look direction, head movement or body movement of a user of the wearable audio device.

In some implementations, the sensor system includes a microphone and the environmental condition includes an ambient acoustic signal.

In particular cases, the control system is configured to analyze the ambient acoustic signal to detect at least one of: a voice of a user in the ambient acoustic signal, a noise level of the ambient acoustic signal or a noise signature of the ambient acoustic signal.

In certain aspects, the sensor system includes a wireless transceiver configured to detect an audio cache proximate the wearable audio device, and the control system is configured to provide a notification about the audio cache in the user prompt to initiate the demonstration mode.

In some cases, during the demonstration mode, the control system is configured to: detect an acoustic signal at the wearable audio device; and apply at least one filter to the detected acoustic signal for playback at the acoustic transducer according to the demonstration mode settings.

In particular implementations, the wearable audio device further includes an active noise reduction (ANR) circuit coupled with the acoustic transducer for filtering the audio playback according to the demonstration mode settings.

In certain cases, the ANR circuit includes a set of controllable noise cancelling (CNC) filters permitting user control of noise cancelling functions at the wearable audio device.

In some implementations, the demonstration mode includes an augmented reality (AR) demonstration mode, and the control system initiates the demonstration mode by outputting an AR message at the transducer during the demonstration mode.

In particular aspects, the demonstration mode includes a voice pickup demonstration mode, the sensor system detects an acoustic signal including a voice signal from a user during the demonstration mode, and the control system is configured to apply at least one filter to the voice signal from the user to provide an audio representation of the filtered voice signal.

In some cases, the method further includes receiving user profile data about a user of the wearable audio device, where detecting the availability of the demonstration mode at the wearable audio device is based upon the user profile data.

In certain implementations, the environmental condition includes a position of the wearable audio device, the position measured as position data including at least one of: acceleration, deceleration, look direction, head movement or body movement of a user of the wearable audio device.

In some cases, the environmental condition includes an ambient acoustic signal, and the method further includes: analyzing the ambient acoustic signal to detect at least one of: a voice of a user in the ambient acoustic signal, a noise level of the ambient acoustic signal or a noise signature of the ambient acoustic signal.

In certain implementations, the method further includes filtering the audio playback according to the demonstration mode settings using an active noise reduction (ANR) circuit, where the ANR circuit includes a set of controllable noise cancelling (CNC) filters permitting user control of noise cancelling functions at the wearable audio device.

In particular aspects, the demonstration mode includes a rewards-based demonstration mode providing a user of the wearable audio device with a reward in response to completion of rewards-based demonstration experiences.

In certain implementations, the user prompt to initiate the demonstration mode is presented to a user at the wearable audio device or another device, and the user prompt is actuatable via an interface at the wearable audio device or the another device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
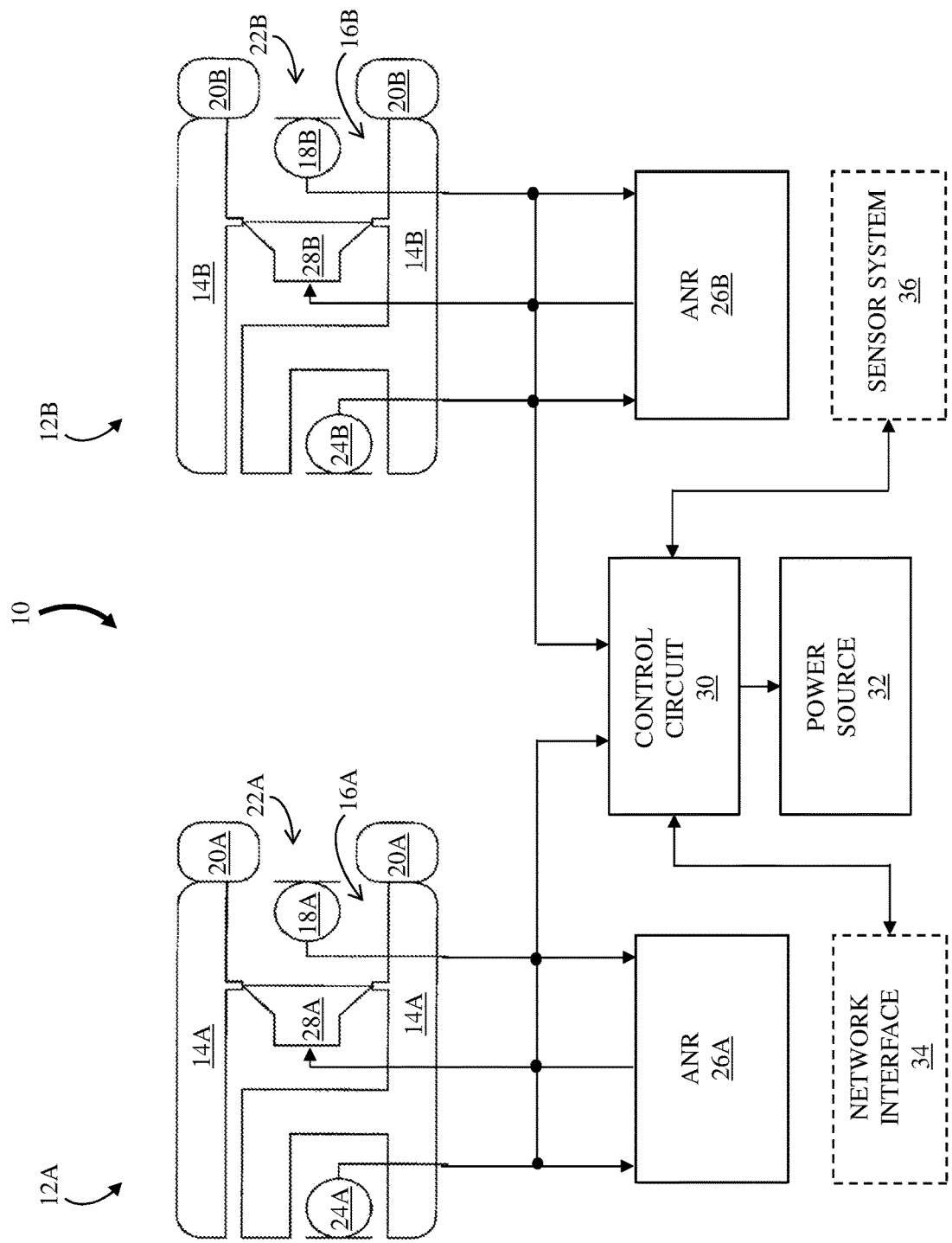
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that features in a wearable audio device can be beneficially demonstrated to a user. For example, a wearable audio device can be configured to demonstrate various features according to detected environmental conditions proximate the device. In certain cases, the wearable audio device prompts the user to initiate a demonstration based upon the detected environmental conditions.

Commonly labeled components in the FIGURES are considered to be substantially equivalent components for the purposes of illustration, and redundant discussion of those components is omitted for clarity.

In contrast to conventional wearable audio devices, various implementations include wearable audio devices configured for a user with a software module or mobile application that permits the user to demonstrate various device functions. The approaches described according to various implementations utilize a sensor system to detect an environmental condition proximate the wearable audio device and/or a biometric state of the user. In particular approaches, components in the sensor system are located at the wearable audio device and/or at a separate, connected device such as a smart device. The wearable audio device and/or the smart device can prompt the user to initiate a demonstration when the sensor system detects that the environmental conditions and/or the biometric state(s) are conducive to demonstration.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be separately acoustically output with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones, such as conversation enhancing functions. While the term ANR is used to refer to acoustic output of anti-noise sounds, this term can also include controllable noise canceling (CNC), which permits control of the level of anti-noise output, for example, by a user. In some examples, CNC can permit a user to control the volume of audio output regardless of the ambient acoustic volume.

Aspects and implementations disclosed herein may be applicable to a wide variety of personal audio devices, such as wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones, audio eyeglasses, head-worn audio devices and various other types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 (e.g., a wearable audio device) having two earpieces 12A and 12B, each configured to direct sound towards an ear of a user. Features of the personal audio device 10 can be particularly useful as a wearable audio device, e.g., a head and/or shoulder-worn audio device. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. An ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR (which may include CNC), the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24, and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP) and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a wearer may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34) or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In implementations of the personal audio device 10 having an ANR circuit 26, that ANR circuit 26 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices. However, in additional implementations of the personal audio device 10 that do not include an ANR circuit 26, these D/A converters, amplifiers and associated circuitry can be located in the control circuit 30.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling audio demonstration functions according to various particular implementations. It is understood that portions of the control system (e.g., instructions) could also be stored in a remote location or in a distributed location, and could be fetched or otherwise obtained by the control circuit 30 (e.g., via any communications protocol described herein) for execution. The instructions may include instructions for controlling audio demonstration functions, as well as digital signal processing and equalization. Additional details may be found in U.S. Patent Application Publication 20140277644, U.S. Patent Application Publication 20170098466, and U.S. Patent Application Publication 20140277639, the disclosures of which are incorporated here by reference in their entirety.

Personal audio device 10 can also include a sensor system 36 coupled with control circuit 30 for detecting one or more conditions of the environment proximate personal audio device 10 and/or biometric conditions of the user of the personal audio device 10. Sensor system 36 can include one or more local sensors (e.g., inner microphones 18 and/or outer microphones 24) and/or remote or otherwise wireless (or hard-wired) sensors for detecting conditions of the environment proximate personal audio device 10 and/or biometric conditions of the user of the personal audio device 10 as described herein. As described further herein, sensor system 36 can include a plurality of distinct sensor types for detecting conditions proximate the personal audio device 10. The sensor system 36, as noted herein, can include one or more sensors physically located at the personal audio device 10 and/or physically located at one or more smart devices.

Figure 2:
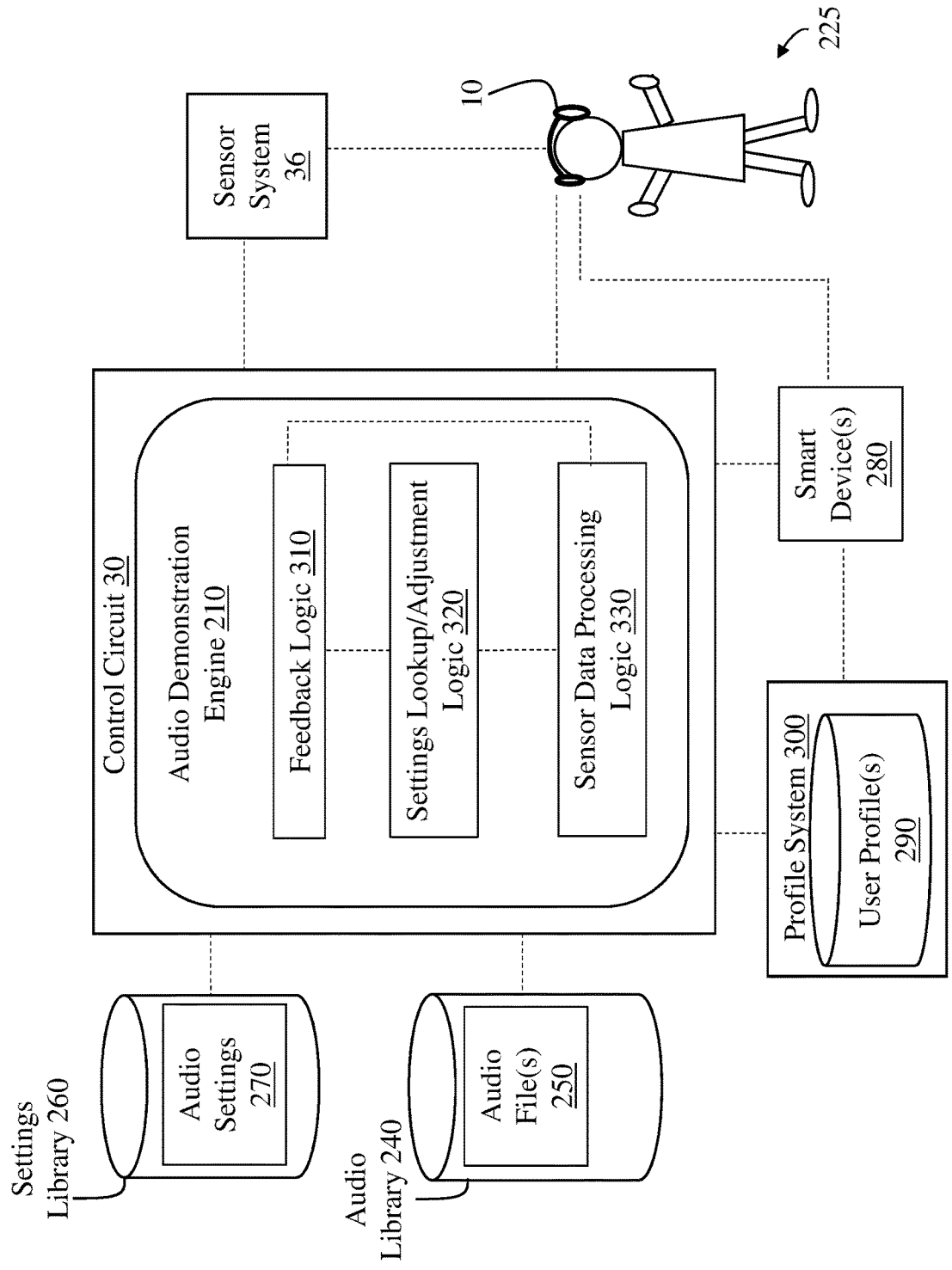
FIG. 2 is a schematic data flow diagram illustrating control processes performed by an audio demonstration engine in the personal audio device of FIG. 1.

As described with respect to FIG. 1, control circuit 30 can execute (and in some cases store) instructions for controlling audio functions in personal audio device 10 and/or a smart device coupled with the personal audio device 10 (e.g., in a network). As shown in FIG. 2, control circuit 30 can include an audio demonstration engine 210 configured to implement demonstrations of various acoustic-related features of the personal audio device 10. Additionally, one or more portions of the audio demonstration engine 210 (e.g., software code and/or logic infrastructure) can be stored on or otherwise accessible to one or more smart devices 280, which may be connected with the control circuit 30 by any communications connection described herein. As described herein, particular functions of the audio demonstration engine 210 can be beneficially employed on the smart device(s) 280. In various particular implementations, the smart device(s) 280 is a separate device, such as a smart phone, tablet, wearable smart device, etc., and can include a sensor system (including one or more sensors described herein) and a network interface or other communications module for communicating with the control circuit 30 on the personal audio device 10.

Figure 3:
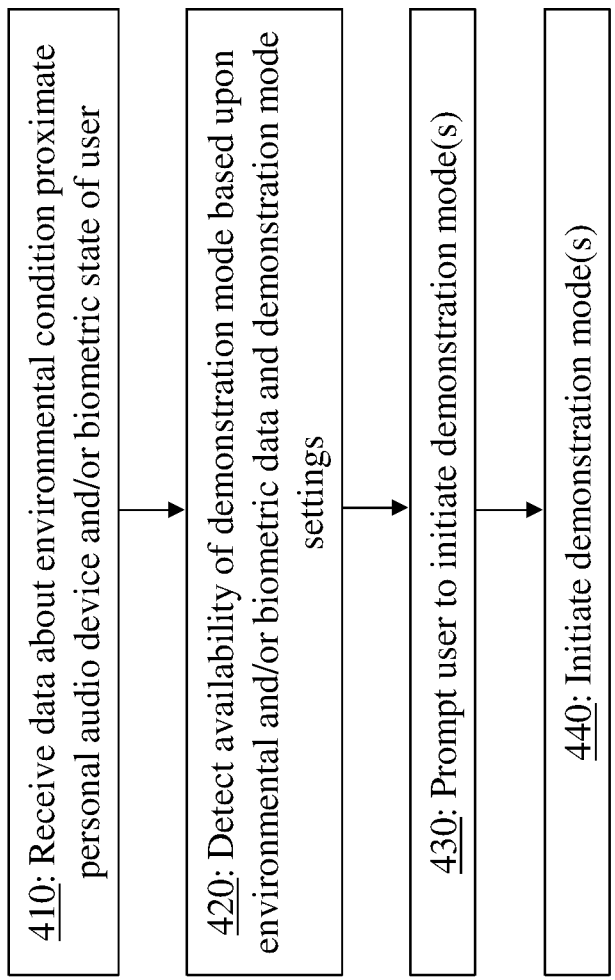
FIG. 3 is a process flow diagram illustrating processes performed by the audio demonstration engine shown in FIG. 2.

In particular, FIG. 2 shows a schematic data flow diagram illustrating a control process performed by audio demonstration engine 210 in connection with a user 225. It is understood that in various implementations, user 225 can include a human user. FIG. 3 shows a process flow diagram illustrating processes performed by audio demonstration engine 210 according to various implementations. FIGS. 2 and 3 are referred to simultaneously.

Returning to FIG. 2, data flows between audio demonstration engine 210 and other components in personal audio device 10 are shown. It is understood that one or more components shown in the data flow diagram may be integrated in the same physical housing, e.g., in the housing of personal audio device 10, or may reside in one or more separate physical locations.

Audio demonstration engine 210 can be coupled (e.g., wirelessly and/or via hardwired connections in personal audio device 10) with an audio library 240, which can store audio files 250 for identifying acoustic sources. Audio library 240 can be associated with digital audio sources accessible via network interface 34 (FIG. 1) described herein, including locally stored, remotely stored or Internet-based audio libraries. In additional implementations, as discussed herein, the audio demonstration engine 210 is configured to identify characteristics (e.g., SPL, frequency response, etc.) in noise detected by microphones to determine characteristics of the environment for demonstrating functions of the personal audio device 10.

Audio demonstration engine 210 can also be coupled with a settings library 260 for controlling audio setting(s) on the personal audio device 10. The settings library 260 can include a group of audio settings 270 for applying different modifications to incoming acoustic signals received at the personal audio device 10. As described herein, the settings 270 can be adjusted based upon the particular demonstration mode selected for a device feature. In certain cases, adjusting the audio settings 270 in the personal audio device can include adjusting one or more of: a directivity of a microphone array in the personal audio device 10, a microphone array filter on the microphone array in the personal audio device 10, a volume of audio provided to the user 225 at the personal audio device 10, parameters controlling wide dynamic range compression, gain parameters controlling the shape of the frequency versus gain function, a number of microphones used in the array, ANR or awareness settings, self-voice parameters, or processing applied to one or more microphone inputs (e.g., as described in U.S. patent application Ser. No. 15/627,905, filed Jun. 20, 2017, titled "Audio Device with Wakeup Word Detection" and U.S. patent application Ser. No. 15/463,368, filed Mar. 20, 2017, titled "Audio Signal Processing for Noise Reduction", each of which is herein incorporated by reference in its entirety).

As noted herein, audio demonstration engine 210 can also be coupled with smart device 280. In some cases, smart device 280 can have access to one or more user profiles 290 (e.g., in a profile system 300) or biometric information about user 225, however, this access is not required in all instances. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. In various particular implementations, the smart device 280 can include an audio playback device, for example, a speaker and a control circuit for providing audio output. Various smart devices include such audio playback devices. In some implementations, the smart device 280 can include a conventional user interface for permitting interaction with user 225, and can include one or more network interfaces for interacting with control circuit 30 and other components in personal audio device 10 (FIG. 1). In some example implementations, smart device 280 can be utilized for: connecting personal audio device 10 to a Wi-Fi network; creating a system account for the user 225; setting up music and/or location-based audio services; browsing content for playback; setting preset assignments on the personal audio device 10 or other audio playback devices; transport control (e.g., play/pause, fast forward/rewind, etc.) for the personal audio device 10; selecting one or more personal audio devices 10 for content playback (e.g., single room playback or synchronized multi-room playback); and providing audio playback according to one or more demonstration modes. In some cases smart device 280 may also be used for: music services setup; browsing of content; setting preset assignments on the audio playback devices; transport control of the audio playback devices; and selecting personal audio devices 10 (or other playback devices) for content playback. Smart device 280 can further include embedded sensors for measuring biometric information about user 225, e.g., travel, sleep or exercise patterns; body temperature; heart rate; or pace of gait (e.g., via accelerometer(s)). Further, it is understood that one or more functions of the audio demonstration engine 210 can be stored, accessed and/or executed at smart device 280.

User profiles 290 may be user-specific, community-specific, device-specific, location-specific or otherwise associated with a particular entity such as user 225. User profiles 290 can include user-defined playlists of digital music files, audio messages stored by the user 225 or another user, or other audio files available from network audio sources coupled with network interface 34 (FIG. 1), such as network-attached storage (NAS) devices, and/or a DLNA server, which may be accessible to the personal audio device 10 (FIG. 1) over a local area network such as a wireless (e.g., Wi-Fi) or wired (e.g., Ethernet) home network, as well as Internet music services such as Pandora®, vTuner®, Spotify®, etc., which are accessible to the personal audio device 10 over a wide area network such as the Internet. In some cases, profile system 300 is located in a local server or a cloud-based server, similar to any such server described herein. User profile 290 may include information about audio settings associated with user 225 or other similar users (e.g., those with common hearing attributes or demographic traits), frequency with which particular audio settings are changed by user 225 or other similar users, etc. Profile system 300 can be associated with any community of users, e.g., a social network, subscription-based music service, and may include audio preferences, histories, etc. for user 225 as well as a plurality of other users. In particular implementations, profile system 300 can include user-specific preferences (as profiles 290) for audio settings 270. Profiles 290 can be customized according to particular user preferences, or can be shared by users with common attributes.

Audio demonstration engine 210 is also configured to receive sensor data from sensor system 36. Additionally, as noted herein, the audio demonstration engine 210 can receive sensor data from the smart device 280. This sensor data can be used to control various functions such as ANR (and CNC) functions, dynamic volume control, notifications, etc. In some cases, sensor system 36 can include one or more of the following sensors: a position tracking system; an accelerometer/gyroscope/magnetometer; one or more biometric sensors (e.g., a heart rate sensor, a photoplethysmogram (PPG), electroencephalogram (EEG), electrocardiogram (ECG) or EGO); a microphone (e.g., including one or more microphones, which may include or work in concert with microphones 18 and/or 24); and a wireless transceiver. These sensors are merely examples of sensor types that may be employed according to various implementations. It is further understood that sensor system 36 can deploy these sensors in distinct locations and distinct sub-components in order to detect particular environmental information relevant to user 225 and the personal audio device 10.

A position tracking system can include one or more location-based detection systems such as a global positioning system (GPS) location system, a Wi-Fi location system, an infra-red (IR) location system, a Bluetooth beacon system, etc. In various additional implementations, the position tracking system can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope or radar) for detecting a direction in which the user 225 is facing, as well as movement of the user 225 and the personal audio device 10. The position tracking system can be configured to detect changes in the physical location of the personal audio device 10 and/or user 225 (where user 225 is separated from personal audio device 10) and provide updated sensor data to the audio demonstration engine 210. The position tracking system can also be configured to detect the orientation of the user 225, e.g., a direction of the user's head, or a change in the user's orientation such as a turning of the torso or an about-face movement.

An accelerometer/gyroscope/magnetometer can include distinct accelerometer components, gyroscope components, and magnetometer components, or can be collectively housed in a single sensor component, e.g., an inertial measurement unit (IMU). This component may be used to sense gestures based on movement of the user's body (e.g., head, torso, limbs) while the user is wearing the personal audio device 10 or interacting with another device (e.g., smart device 280) connected with personal audio device 10. As with any sensor in sensor system 36, the accelerometer/gyroscope/magnetometer may be housed within personal audio device 10 or in another device connected to the personal audio device 10.

A biometric sensor can include one or more of a heart rate sensor, a PPG, an EEG, an ECG or an EGO. Additional biometric sensors can also be integrated in the sensor system 36. In particular cases, the biometric sensor(s) can be housed in the personal audio device 10, e.g., in a wristband in a wrist-worn device, in an earpiece, a band or a support member in a head-worn device, or in any housing in a body or shoulder-worn device. In additional implementations, one or more biometric sensors can be housed in the smart device 280, e.g., in a smart phone or smart watch. The biometric sensor(s) can be used to sense the biometric state of the user 225 while wearing the personal audio device 10 or interacting with another device (e.g., smart device 280) connected with the personal audio device 10.

The microphone (which can include one or more microphones, or a microphone array) can have similar functionality as the microphone(s) 18 and 24 shown and described with respect to FIG. 1, and may be housed within personal audio device 10 or in another device (e.g., smart device 280) connected to the personal audio device 10. As noted herein, microphone(s) may include or otherwise utilize microphones 18 and 24 to perform functions described herein. Microphone(s) can be positioned to receive ambient acoustic signals (e.g., acoustic signals proximate personal audio device 10). Acoustic signals can include voice signals, noise signals, etc. In some cases, these ambient acoustic signals include speech/voice input from user 225 to enable voice control functionality. In example implementations, the microphone can detect the voice of user 225 and/or of other users proximate to or interacting with user 225. In particular implementations, audio demonstration engine 210 is configured to analyze one or more voice commands from user 225 (via microphone), noise levels in the ambient acoustic signal, or noise signature(s) in the ambient acoustic signal, and modify the applied audio settings 270 on the personal audio device 10. In some cases, the audio demonstration engine 210 can include sensor data processing logic for analyzing the ambient acoustic signal. In those cases where the ambient acoustic signal includes a voice command, the sensor data processing logic can include natural language processing (NLP) logic or other similar logic for analyzing voice commands.

As noted herein, the sensor system 36 can also include a wireless transceiver (comprising a transmitter and a receiver), which may include, a Bluetooth (BT) or Bluetooth Low Energy (BLE) transceiver or other conventional transceiver device. The wireless transceiver can be configured to communicate with other transceiver devices in distinct components (e.g., smart device 280 or devices belonging to other users).

It is understood that any number of additional sensors can be incorporated in sensor system 36, and can include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

According to various implementations, control circuit 30 includes the audio demonstration engine 210, or otherwise accesses program code for executing processes performed by audio demonstration engine 210 (e.g., via network interface 34). Audio demonstration engine 210 can include logic for processing feedback from the user 225 about the demonstration modes (feedback logic 310). Additionally, audio demonstration engine 210 can include logic for looking up and adjusting audio settings according to feedback received from the user 225 and/or known characteristics of the demonstration (settings lookup/adjustment logic 320). The audio demonstration engine 210 can also include logic for processing sensor data from the sensor system 36, e.g., data about ambient acoustic signals from microphones, data about a location of the personal audio device 10, biometric data from a smart device, and/or usage data from a smart device (sensor data processing logic 330).

As noted herein, audio demonstration engine 210 can include logic for performing audio demonstration functions according to various implementations. FIG. 3 shows a flow diagram illustrating processes in audio demonstration performed by the audio demonstration engine 210 and its associated logic. FIGS. 1-3 are referred to simultaneously, with particular reference to FIGS. 2 and 3.

In a first process, the audio demonstration engine 210 can receive data about an environmental condition proximate the personal audio device 10 and/or biometric data about the user 225 from sensor system 36 (process 410, FIG. 3). As described herein, the sensor system 36 can include various sensors configured to detect one or more environmental conditions proximate the personal audio device 10 and/or a biometric state of the user 225. In the case of environmental conditions, as is further described herein, the sensor system 36 can be located at the personal audio device 10 and/or the smart device 280, such that particular environmental conditions are attributable to the sensor system 36 (e.g., location, position/orientation). In the case of the user's biometric state, the sensor system 36 can be located at the personal audio device 10 and/or smart device 280, in any location where biometric data about the user 225 can be detected (e.g., areas in proximity to or in contact with the user's skin).

In some cases, the sensor system 36 includes a location tracking system for detecting a location of the personal audio device 10, e.g., a location within a room or other space, a neighborhood, a city, etc. The location tracking system can include any one of the location tracking systems described herein, including, e.g., GPS location detection, Wi-Fi based location detection, peer-to-peer location detection, or other conventional location detection systems. The location tracking system can detect an environmental condition such as a proximity to a location of interest, movement between locations (e.g., movement in a vehicle such as a plane, train or automobile from point A to point B), a proximity to another audio device in a network of audio devices (e.g., another user with a personal audio device), or a proximity to a smart device associated with a user distinct from a user of the wearable audio device.

In some implementations, the sensor system 36 includes a position tracking system for detecting a position of the user 225 (e.g., at the personal audio device 10 and/or smart device 280). As noted herein, sensor data about position tracking can be used to detect user movement, orientation changes, etc., that may or may not be detectable as location changes. In some particular cases, the position tracking system includes a head tracking system or a body tracking system for detecting an environmental condition such as acceleration, deceleration, look direction, head movement and/or body movement of the user 225 while wearing the personal audio device 10.

In certain implementations, as noted herein, the sensor system 36 includes one or more biometric sensors for detecting a biometric state of the user 225. In some cases, the audio demonstration engine 210 is configured to detect a biometric signal about the user 225 at the personal audio device 10 and/or the smart device 280. The biometric signal can be detected, for example, by biometric sensors such as a heart rate sensor, PPG, EEG, and/or ECG. For example, a heart rate sensor can indicate that the user 225 is exercising, or that the user 225 is fatigued. In these cases, demonstrations and related prompts can be tailored to the user's current biometric state, e.g., an exercise coaching demo can be offered where the biometric sensor(s) detect biometric signals indicating that the user 225 is exercising, such as heart rate or perspiration detection.

In certain implementations, the sensor system 36 includes one or more microphones (e.g., similar to microphones 18, 24 described herein) for detecting an environmental condition such as an ambient acoustic signal. In particular cases, the audio demonstration engine 210 is configured to analyze the detected ambient acoustic signal to detect at least one of: a voice of a user in the ambient acoustic signal, a noise level of the ambient acoustic signal or a noise signature of the ambient acoustic signal.

In particular cases, the detected acoustic signal has an acoustic signature that indicates a characteristic of the source, such as the sound pressure level (SPL) of the source, or the identity of the source. For example, the acoustic signature of the detected acoustic signal can indicate the source of the detected acoustic signal is a voice of the user 225, a voice of another user, a noise source, a notification system or an alert system. In certain cases, the audio demonstration engine 210 can include a voice activity detection and/or recognition circuit for detecting the user's voice and/or differentiating the user's voice from the voice of others in the vicinity. In some cases, the audio demonstration engine 210 can compare the acoustic signature of the detected acoustic signal(s) with stored audio files 250 in audio library 240 (FIG. 2) to detect the characteristic(s) of the source. For example, the stored audio files 250 can include data about acoustic signatures of common notifications or alerts, voice signatures and/or background noises/sounds (e.g., tones, decibel levels, frequency ranges). In some cases, notifications can include non-urgent reminders or indicators of particular events, for example, calendar notifications, email notifications or message notifications. Alerts can include more urgent information such as sirens, alarms or high-pitched sounds.

According to additional implementations, the sensor system 36 can include a wireless transceiver configured to detect an audio cache proximate the personal audio device 10. Examples of audio caches can include, a song, a pre-recorded message from a user or a pre-recorded message from an information source. Audio cache(s) can be stored, e.g., in a local network at a geographic location or in a cloud storage system connected with a geographic location. In some cases, another user, a business establishment, government entity, tour group, etc. could leave an audio cache (e.g., a song or pre-recorded message) at particular geographic (or virtual) locations, and the wireless transceiver can be configured to detect this cache and prompt user 225 regarding playback of the cache file. In certain implementations, the audio demonstration engine is configured to provide a notification about the audio cache in the user prompt to initiate the demonstration mode (e.g., "Would you like to hear an audio cache stored at this location?", or "This demonstration mode includes playback of an audio cache").

Following receiving data about the environmental condition proximate the personal audio device 10 and/or the biometric data about the user, the audio demonstration engine 210 is configured to detect availability of a demonstration mode at the personal audio device 10 based upon that environmental condition data and demonstration mode settings (e.g., settings 270, FIG. 2) for the device (process 420, FIG. 3). The demonstration mode settings can include settings for demonstrating a plurality of acoustic features of the personal audio device 10. These demonstration mode settings can also include capabilities listings or other references to capabilities of the personal audio device 10 for one or more demonstration modes. For example, a demonstration mode employing active noise reduction may require that the personal audio device 10 have both feedforward and feedback microphones. The settings for that demonstration mode can indicate that these hardware components (along with corresponding DSP hardware/software) are necessary to perform the active noise reduction demonstration. In another example, a demonstration mode employing heart rate monitoring may require that the personal audio device 10 and/or the smart device 280 have a heart rate monitor. The settings for that demonstration mode can indicate that this hardware component is necessary to perform the demonstration.

Examples of the various demonstration modes can include a playback mode, a focused listening mode, a general listening mode, an active noise reduction (ANR) mode, a controllable noise cancellation (CNC) mode, a voice pick-up mode, an augmented reality (AR) mode, a voice playback mode, etc. In particular examples, demonstration mode availability can be detected at the personal audio device 10 and/or the smart device 280. In one example, the audio demonstration engine 210 is run as a software application on the smart device 280. The audio demonstration engine 210 can send a request to the personal audio device 10 (e.g., via a conventional communications protocol, such as Bluetooth) for information (e.g., a listing) of capabilities of the personal audio device 10. The personal audio device 10 responds to the request from the audio demonstration engine 210 running on the smart device 280, over the same communications link (or, shared protocol) established by the request. The response from the personal audio device 10 can include a listing or other indicating of capabilities, e.g., feedback and feedforward ANR, voice pick up, motion tracking sensor(s), biometric sensor(s), etc.). In another example, the personal audio device 10 can send a request (e.g., via conventional communications protocol) to the smart device 280 to request information about capabilities of the audio demonstration engine 210. The personal audio device 10 can send a response to the request (e.g., via a shared protocol link) with information indicating capabilities of the audio demonstration engine 210 (e.g., signal processing capabilities, voice pick up, motion tracking sensor(s), biometric sensor(s), etc.

After the audio demonstration engine 210 detects the availability of the demonstration mode in the personal audio device 10, it can provide the user 225 with a prompt to initiate one or more available demonstration modes (process 430, FIG. 3). The prompt can take the form of any prompt described herein, e.g., a visual prompt, an audio prompt and/or a tactile prompt at the personal audio device 10 and/or smart device 280.

In response to actuation of the user prompt (e.g., by user 225), at the personal audio device 10 or another device (e.g., smart device 280), the audio demonstration engine 210 can initiate the demonstration mode (process 440, FIG. 3).

As also noted herein, the audio demonstration engine 210 is configured to initiate a demonstration mode in the personal audio device 10 that is connected with a separate audio playback device (e.g., smart device 280). In some cases, the demonstration mode can be initiated by a user command, e.g., by a user command at an interface on the personal audio device 10 and/or the smart device 280. In certain cases, the user 225 can initiate the demonstration mode through a software application (or, app) running on the smart device 280 and/or the personal audio device 10 in response to a prompt from the audio demonstration engine 210. The interface on the smart device 280 and/or personal audio device 10 can include a tactile interface, voice command interface, gesture-based interface and/or any other interface described herein. In some cases, the audio demonstration engine 210 can prompt the user 225 to begin a demonstration process (e.g., using any prompt described herein) based upon the environmental data and/or the biometric data gathered from sensors 36, as well as demonstration mode settings for the device 10. In certain implementations, the demonstration mode can be launched via an app or other program running on the smart device 280 and/or personal audio device 10. As described herein, the separate audio playback device can include a smart device such as a smart phone, tablet, PC, etc., or any other connected playback device such as a fixed or portable speaker system, a home entertainment audio system, a vehicle audio system, etc.

In various implementations, a plurality of sensors in the sensor system 36 can be used to detect a demonstration mode available to the user 225. For example, the audio demonstration engine 210 can receive data from two or more sensors in the sensor system 36 that together verify a demonstration is available. In one example, the audio demonstration engine 210 can detect that the user 225 is on an airplane based upon data received from two or more sensors in the sensor system 36. For example, external microphones can detect noise that matches a signature of a plane environment (e.g., in terms of frequency or tone), the accelerometer/gyroscope/magnetometer can indicate that the user 225 is accelerating or traveling at a high speed, and/or the smart device 280 is set in an "airplane mode" or similar reduced-function setting common to users traveling on an airplane. In response to receiving two or more of these inputs from the sensor system 36, the audio demonstration engine 210 can prompt the user 225 to experience a noise reduction/cancellation demonstration (e.g., an ANR demonstration mode). Additional examples can include combining data inputs from biometric sensors (e.g., heart rate sensor) with inputs from other sensors (e.g., accelerometer/gyroscope/magnetometer) to determine that the user 225 is exercising. In these examples, the audio demonstration engine 210 can receive data from the biometric sensor that indicates the user's heart rate is higher than a resting rate (or more specifically, in a range indicative of significant exertion), and also receive data from the accelerometer/gyroscope/magnetometer indicating that the user 225 is traveling at a rate of speed that corresponds with running or jogging (e.g., 5-10 miles per hour). In response to receiving these two (or more) data inputs from the sensor system 36, the audio demonstration engine 210 can prompt the user 225 to experience one or more demonstration modes (e.g., ANR demonstration mode, fully aware demonstration mode, a fitness coaching mode, etc.).

The audio demonstration engine 210 is also configured to receive a command from the user 225 (e.g., via a voice interface, gesture interface and/or tactile interface on the smart device 280 and/or the personal audio device 10) to demonstrate an acoustic feature of the personal audio device 10. The user command can be made in response to a prompt, e.g., where the audio demonstration engine 210 provides a visual prompt and/or an audio prompt ("It appears that you are on an airplane. Would you like to experience controllable noise cancelling features of your personal audio device?", or "You are in a noisy environment. Nod your head or tap twice on your right earphone to initiate a demonstration of the voice pickup functions").

The audio demonstration engine 210 is configured to apply audio settings to acoustic signals according to the initiated demonstration mode. In some cases, applying these audio settings includes filtering acoustic signals according to the initiated demonstration mode. That is, in various implementations, in response to the acoustic signature of a detected acoustic signal matching an acoustic signature in the audio library 240, the audio demonstration engine 210 can apply one or more filters to the signal(s). In other example implementations, the acoustic demonstration settings (e.g., audio settings 270) for a particular mode can use microphone array directionality to control the audio output to the user 225.

The personal audio device 10 can have a plurality of demonstration modes, such as a playback mode, a focused listening mode, a general listening mode, an ANR mode, a CNC mode, an augmented reality mode (AR), a voice pickup mode, a voice playback mode, etc. The demonstration modes can include microphone directionality/selectivity control, ANR and/or CNC functionality to modify (e.g., reduce) the impact of ambient acoustic signals while the user 225 experiences functions of the personal audio device 10.

For example, playback demonstration mode can be desirable when the user 225 is listening to music, a podcast or on a phone call using the personal audio device 10. Focused listening demonstration mode can use microphone array directionality to focus on one or more areas proximate the user 225 (e.g., based upon acoustic signal sources, as described herein). In this example, focused listening mode can be activated by the audio demonstration engine 210 based upon environmental condition data (e.g., as inputs from sensor system 36). Focused listening mode may employ selective ANR and/or CNC functionality to direct microphones (or apply signal processing for directionalizing microphone inputs) in one or more particular directions. For example, focused listening mode may be beneficial where the user 225 wishes to focus on one sound source in an environment, such as one person speaking in a group, or the sound of a television from across a noisy room.

General listening mode, which may also be called Aware mode or full awareness mode, can essentially permit the user 225 to hear all ambient acoustic signals at approximately their naked-ear decibel level. That is, the general listening mode allows the user 225 to hear unobstructed acoustic signals from the environment. In some particular cases, the general listening mode increases the audibility of the acoustic signals based upon the playback level options (volume, tone, etc. preferences in audio settings 270), e.g., in order to provide audio playback at the personal audio device 10 at the same level as the received acoustic signals at the outer microphones or an adjusted level based upon user preferences. General listening mode may be beneficial when the user 225 wishes to pause or stop audio playback but does not wish to doff his/her personal audio device 10 (e.g., in the case of headphones), remaining aware of the surrounding acoustic environment.

In other examples, a CNC demonstration mode allows the user 225 to adjust noise canceling functions on the personal audio device 10 to experience distinct levels of noise canceling. CNC demonstration mode can allow the user 225 to adjust different levels of noise cancellation using one or more interface commands, e.g., by increasing noise cancellation or decreasing noise cancellation across a spectrum. CNC mode can be beneficial when the user 225 is in a dynamic acoustic environment, such as a sporting event or a party, where the ambient acoustic signals may vary in proximity and intensity over short periods.

Additionally, microphone array directionality, selectivity (e.g., number of active microphones), and/or microphone array filter selection can be adjusted based upon detected characteristics of the (acoustic) environment proximate the personal audio device 10, e.g., where the characteristics of the acoustic environment are detected by the sensor system 36. For example, microphone(s) can detect the acoustic signature of the user's voice, and the audio demonstration engine 210 can be configured to adjust the microphone array directionality to direct the array toward the front of the user's head (e.g., proximate the user's mouth) to detect voice commands. In other cases, the microphone(s) can detect an acoustic signature of ambient acoustic signals in order to cancel or otherwise minimize those signals (e.g., low-level noise such as the hum of an appliance, or wind noise). The audio demonstration engine 210 can apply filters to these ambient acoustic signals based upon the operating mode of the personal audio device 10. For example, wind noise reduction can be suitable for demonstration while the user 225 is on a phone call using the personal audio device 10.

Additionally, where the sensor system 36 detects that the user 225 is accelerating or decelerating, the audio demonstration engine 210 can be configured to demonstrate ANR functions of the personal audio device 10. For example, ANR functions can be demonstrated to show effects on high v. low pressure events (e.g., a door slamming, vehicle accelerating, plane ascending). Additionally, detecting acceleration and/or deceleration can be used to trigger demonstration of different listening modes, e.g., when the user 225 is accelerating, the audio demonstration engine 210 can offer to demonstrate general listening mode so that the user 225 can clearly hear ambient acoustic signals, or to reduce the acoustic occlusion that some users experience when taking steps. In another case, the audio demonstration engine 210 can offer to demonstrate conversation mode in response to detecting that the user 225 quickly moves or jerks his/her head in a direction. This can enable the user 225 to focus on the acoustic sound source in his/her look direction.

In other cases, the audio demonstration engine 210 can be configured to adjust audio outputs in response to the sensor system 36 detecting that the user 225 is proximate another user (e.g., via network interface communication such as Wi-Fi or BLE). For example, the audio demonstration engine 210 the audio demonstration engine 210 can offer to share one or more demonstration functions between the user 225 and this other user. For example, the audio demonstration engine 210 can prompt the user 225 to initiate a peer-to-peer (P2P) music or other file sharing demonstration, two-way communication demonstration and/or shared listening/interaction demonstration with the other user when that other user is detected as being proximate the user 225.

In particular cases, the audio demonstration engine 210 can initiate a voice pick-up demonstration mode in response to detecting that the personal audio device 10 is in a noisy environment. For example, microphones in the sensor system 36 can detect an ambient noise level (SPL) that is above a threshold, and in response to receiving data indicating the ambient noise level is above the threshold, the audio demonstration engine 210 prompts the user 225 to initiate a voice pick-up demonstration mode. In the case of a headphone system, the personal audio device 10 can run a binaural voice pick-up algorithm, for example, using one or more beamformed microphones for each earpiece that can effectively detect the user's voice. This voice detection approach and variations of that approach are described in U.S. patent application Ser. No. 15/463,368, previously incorporated herein by reference in its entirety. In the voice pick-up demonstration mode, the audio demonstration engine 210 is configured to switch between microphones used in one or more earpieces (e.g., use a single microphone, a pair of beamformed microphones on one earcup, use the full binaural algorithm with two beamformed microphones on each cup, or variations in between), and/or change the processing applied to the microphones (e.g., beamforming or no beamforming, and/or other conventional signal processing techniques).

After applying the acoustic demonstration settings to the personal audio device, the audio demonstration engine 210 is further configured to output the acoustic signal(s) for playback at the personal audio device 10, e.g., at transducers 28. In certain cases, the filtered acoustic signal(s) are provided as binaural playback (e.g., in a headphone or earphone configuration), however, these filtered acoustic signals can be output at the personal audio device 10 according to any conventional approaches. In some cases, these acoustic signals include signals that have been filtered according to one or more approaches described herein.

Various features of the audio demonstration engine 210 can be effectively illustrated by way of example implementations. Many features described with reference to these examples are performed by the audio demonstration engine 210 in detecting the availability of the demonstration mode based upon environmental data and demonstration mode settings (process 420, FIG. 3).

For example, adaptive CNC illustrates various noise cancelling functions in the personal audio device 10. In some example implementations, the audio demonstration engine 210 receives environmental data (e.g., from sensor system 36) indicating that the ambient noise is varying (e.g., changing in terms of volume, frequency, etc.), and during this variation, the user 225 is adjusting a volume or other playback setting on the personal audio device 10 (as detected by control circuit 30). In these cases, the audio demonstration engine 210 can detect these two conditions, and present the user with a prompt to initiate the adaptive CNC demonstration mode. Adaptive CNC allows the user 225 to adjust noise cancelling functions so that regardless of the ambient noise level (i.e., loudness of ambient sound) the user 225 hears playback at the personal audio device 10 at the same output level. In various implementations, the user 225 can select a desired adaptive CNC output level, such that when this mode is engaged, the user 225 receives an acoustic output from the personal audio device 10 that does not vary with the changes in ambient sound level.

In additional examples, device proximity can be used to illustrate social functions in the personal audio device 10. For example, the sensor system 36 can detect the proximity of the personal audio device 10 to another personal audio device (e.g., two personal audio devices of the same brand or company, or both running the audio demonstration engine 210). In these cases, the audio demonstration engine 210 can detect that the personal audio device 10 is within a predefined distance from the other personal audio device (e.g., a radius of several feet, blocks or miles). The proximity detection can be performed using one or more of the location tracking systems described herein, (e.g., GPS, Wi-Fi, Bluetooth), and where the demonstration mode settings enable proximity detection, the audio demonstration engine 210 can prompt the user 225 to temporarily connect the personal audio device 10 with the additional personal audio device. This connection can enable the user 225 to initiate a peer-to-peer (P2P) music or other file sharing demonstration, two-way communication demonstration and/or shared listening/interaction demonstration with another other user when that other user is detected as being proximate the user 225. In additional implementations, the audio demonstration engine 210 can provide a demonstration of the functions of the social connection (e.g., P2P music or file sharing, two-way communication, shared listening/interaction) as though the user 225 had already enabled the social connection functions. In these cases, where the sensor system 36 detects proximity to another personal audio device that has also enabled social connection demonstration, the audio demonstration engine 210 may begin demonstrating social connection functions without requesting that the user 225 temporarily connect the personal audio device 10 with the additional device.

In additional examples, the user 225 is prompted to broadcast himself/herself to other nearby users with accounts in one or more common organizations, e.g., dating service organizations, social networking organizations, fan club organizations. The audio demonstration engine 210 can detect other users proximate the personal audio device 10 (as described herein) that have also enabled broadcasting, and can cross-reference those users with account information available in the profile system 300, e.g., profile settings, common songs on favorite playlists, etc. When one or more users has enabled broadcasting and meets proximity and settings criteria, the audio demonstration engine 210 can prompt the user 225 to initiate a broadcast demonstration mode, for example, by sending a broadcast notification to those other users. The broadcast notification can include an invitation to share files (e.g., music files) or engage in a conversation (e.g., an audio device-to-audio device conversation). In additional implementations, when one or more users has enabled broadcasting and meets proximity and settings criteria, the audio demonstration engine 210 can initiate a broadcast demonstration mode, for example, by sending a broadcast notification to those other users (without requiring that the user 225 respond to a prompt).

In additional examples, subscription demonstration is used to notify the user 225 that content sources are available in particular locations. In these cases, the sensor system 36 detects proximity to a server hosting a subscription service, or can detect the subscription invitation within a network such as Wi-Fi network, Bluetooth connection, etc. Where the demonstration mode settings enable subscription demonstration, the audio demonstration engine 210 can prompt the user 225 to subscribe to notifications or other content from the content source. These subscription examples could be useful in notification-sensitive locations (e.g., airports, train stations), frequently visited locations (e.g., restaurants, libraries), points of interest (e.g., landmarks, tourist attractions), etc. In additional implementations, the audio demonstration engine 210 can provide a demonstration of the functions of the subscription service as though the user 225 had already subscribed to the content source and enabled the subscription functions. In these cases, where the sensor system 36 detects proximity to a server hosting the subscription service, the audio demonstration engine 210 may begin demonstrating functions of the subscription service (e.g., providing notifications from the content sources) without requesting that the user 225 subscribe to the notifications.

In further examples, event detection is helpful in notifying the user 225 of additional functions of the personal audio device 10. For example, as described herein, an ANR chip in the control circuit 30 is configured to detect a level of ambient noise proximate the personal audio device 10, and if that level of ambient noise exceeds a threshold, notify the user 225 that a demonstration mode is available, e.g., an ANR demonstration mode and/or a voice pick-up demonstration mode. The user can initiate the ANR demonstration mode and/or voice pick-up demonstration mode according to any approach described herein to experience ANR functions of the personal audio device.

In other examples, the audio demonstration engine 210 is configured to detect a spectrum of acoustic signals received at the microphones and prompt the user 225 to initiate a demonstration mode. For example, the audio demonstration engine 210 can detect a sound spectrum of the acoustic signals, such as a noise signature, indicating that the user 225 is in an airplane, automobile, sporting event, etc., and can prompt the user 225 to initiate an ANR demonstration mode, a CNC demonstration mode, or a similar noise controlling demonstration mode to control the noise received via the personal audio device 10. In various implementations, the detected acoustic noise signal is compared with audio files 250 to characterize that acoustic signal, for example, as a noise signal (or a particular noise signal, such as airplane engine noise or crowd noise). In particular cases, the audio demonstration engine 210 is configured to identify the noise signal as particular noise, e.g., by matching the acoustic signature of the detected signal(s) with audio files 250 including acoustic signatures of the noise. Example noise modes can include a wind mode, a rain mode, a traffic mode, etc., for cancelling particular noise sources, e.g., during playback of audio, while on a phone call, or during a general use scenario. The audio demonstration engine 210 can also be configured to provide suggestions to the user 225 to cancel particular noise sources based upon an identified spectral signature of the source and/or the environment.

In some additional examples, the audio demonstration engine 210 is further configured to apply different filters to detected acoustic signals based upon different demonstration modes. In certain cases, the audio demonstration engine 210 is configured to initiate a CNC demonstration mode to demonstrate CNC capabilities of the personal audio device 10 to the user 225. In one example, the audio demonstration engine 210 is configured to detect noise signals proximate the personal audio device 10, such as low-frequency noise, music, or high-frequency noise, and apply a set of distinct CNC filters to the received acoustic signals at the personal audio device 10. In these cases, when the personal audio device 10 detects acoustic signals after the demonstration audio has been initiated, the audio demonstration engine 210 applies a set of distinct CNC filters, in a sequence, to those detected acoustic signals to demonstrate CNC capabilities of the personal audio device 10. For example, the audio demonstration engine 210 can provide progressive or regressive sequences of noise cancelling that mimic the adjustments that the user 225 can make to noise cancelling functions on the personal audio device 10. In some particular cases, the audio demonstration engine 210 applies a first set of CNC filters for a period, then adjusts to a second set of CNC filters for a period, then adjust to a third set of CNC filters for another period (where periods are identical or distinct from one another). The user 225 can then experience how distinct CNC filters compare with one another, for example, by permitting more or less ambient sound (or, "world noise") to enter the playback at the transducers 28.

In other examples, the demonstration mode can include an augmented reality (AR) demonstration mode, where the audio demonstration engine 210 applies the filter(s) to a detected acoustic signal by overlaying AR playback with the playback from the (filtered, or unfiltered) detected acoustic signal. In some cases, this can include overlaying audio playback related to an AR feature with the detected ambient acoustic signal at the transducers 28. Where the AR system includes a navigation function, the AR audio playback can include walking directions to a user 225 wearing an AR headset or other AR device as the user 225 navigates an area. Other examples of AR playback can include audio pins or audio caches associated with particular locations that are triggered as the user 225 approaches those locations. Additional AR playback can include informational content (e.g., menu listings for restaurants, performance listings for concert venues, or sporting schedules for stadiums) provided to the user 225 based upon the user's location, orientation, etc. relative to the subjects of the information. In any case, the audio demonstration engine 210 can be configured to overlay this AR audio content with the detected acoustic signal (s), e.g., to provide this AR audio content within the context of the demonstrated audio mode.

As noted herein, in some cases, the audio demonstration engine 210 is configured to apply a filter to the detected acoustic signal, and to overlay the AR playback with playback from the filtered detected acoustic signal. However, in other cases, the audio demonstration engine 210 does not apply a filter to the detected acoustic signal during the AR demonstration mode, e.g., where noise canceling or noise reduction are not employed. In these cases, the audio demonstration engine 210 overlays the AR playback with playback from the detected (unfiltered) acoustic signal and provides that playback to the user 225.

In additional examples, the audio demonstration engine 210 is configured to detect user motion and/or look direction in order to provide audio demonstration functions. For example, the audio demonstration engine 210 can receive sensor data from the sensor system 36, e.g., including an IMU and/or a gyroscope. This sensor data can indicate a user look direction, that is, a direction in which the user 225 is inferred to be looking based upon the known orientation of the personal audio device 10. The audio demonstration engine 210 can also receive data from microphones (e.g., microphone 18, 24 in the personal audio device 10 or distinct microphones in the sensor system 36) indicating a direction from which one or more particular sound sources is coming. The audio demonstration engine 210 can compare that noise directionality with the inferred look direction to offer particular audio demonstration functions to the user 225. For example, the audio demonstration engine 210 can prompt the user 225 to initiate demonstration of focused audio enhancement when the directionality of a sound source is within a field of view of the user 225 based upon the detected look direction. The audio demonstration engine 210 can additionally detect the acoustic signature of the signals from that sound source to determine whether audio enhancement (or noise reduction) should be offered, e.g., whether the sound matches a noise signature or has characteristics indicative of a particular type of noise or noise level.

Motion detection can also be used to demonstrate an awareness mode. In this example, motion detection sensors in the sensor system 36 (e.g., IMU, gyroscope, GPS) can provide data to the control circuit 30 indicating that the personal audio device 10 is moving, e.g., at a rate of speed indicating that the user 225 is running. In this scenario, the audio demonstration engine 210 can prompt the user 225 to demonstrate awareness mode (or Aware mode), whereby ambient acoustic signals are played back at the personal audio device 10 as though the user is not wearing the personal audio device 10, or ambient acoustic signals are enhanced in playback at the personal audio device 10. In certain example implementations, playback of audio at the personal audio device 10 is able to be interrupted or reduced in volume when acoustic signals matching one or more alert signatures, voice signatures, etc. (in audio files 250) are detected by the microphones. In these cases, the audio demonstration engine 210 can pause playback, reduce playback volume, and/or increase the volume of playback of ambient acoustic signals in response to detecting an acoustic signature of those ambient acoustic signals that matches a saved alert signature or the signature of a voice (e.g., the voice of a nearby additional user).

In other cases, availability of a self-test demonstration mode can be detected when acoustic signatures of ambient acoustic signals match noise signatures (as discussed herein), and the sensor system 36 or user interface inputs from the smart device 280 indicate that the user 225 is attempting to make a phone call or receive a phone call. In these examples, the audio demonstration engine 210 can prompt the user 225 to experience a self-test demonstration mode (e.g., "would you like to test your voice to determine whether to take or make a call in this environment?"). This demonstration mode prompts the user 225 to speak, and plays back the detected acoustic signals from the user's voice as they would be output on the other end of the phone call given the nearby noise. In another example, the audio demonstration engine 210 is configured to prompt the user 225 to experience the self-test demonstration mode using a playback comparison, e.g., "Would you like to hear how your voice sounds with, and without, our enhanced voice pick up system?"). In these cases, the audio demonstration engine 210 can prompt the user 225 to speak, and can provide playback of the detected acoustic signals from the user's voice both with, and without voice pick up functions (e.g., microphone array directionality, microphone array selectivity, noise cancelling, etc.).

In the self-test example, the audio demonstration engine 210 can prompt the user 225 to speak while the microphones detect the ambient noise signals. The prompt can take any form described herein, and can request that the user speak in a conversational tone, or recite a particular phrase (e.g., "Please speak conversationally for 10 seconds", or "Begin speaking now", or "Repeat phrase X"). In any case, while the personal audio device 10 is detecting ambient noise signals, the user 225 is speaking.

In some additional implementations, the audio demonstration engine 210 is configured to detect the user's speech in conjunction with a demonstration mode or to initiate a demonstration mode. The audio demonstration engine 210 is configured to detect the acoustic signal associated with the user's speech, as picked up by one or more microphones at the personal audio device 10 and/or smart device 280. In various implementations, the acoustic signal is compared with audio files 250 to characterize that acoustic signal, for example, as a voice signal. In various other implementations, the acoustic signal is analyzed or measured to detect particular characteristics of the acoustic signal (e.g., SPL, frequency content, frequency response at particular frequency ranges, that the signal originated from the user, etc.). In particular cases, a voice detector in the personal audio device 10 and/or smart device 280 is configured to identify the voice signal as the voice of user 225, e.g., by matching the acoustic signature of the detected signal(s) with audio files 250 including acoustic signatures of the user's voice.

The audio demonstration engine 210 is further configured to apply acoustic settings to the personal audio device 10 in order to process the detected acoustic signal associated with the user's speech, for playback at the personal audio device 10. In some particular cases, this process includes adjusting a number of microphones or configuration (e.g., direction) of microphones used to detect the acoustic signal associated with the user's speech. For example, a single microphone can be used to demonstrate primary microphone functions of the personal audio device 10, whereas two or more microphones can be used to demonstrate beamforming functions of the personal audio device 10. The number of microphones and/or configuration of microphones used for detecting the user's speech can also be modified to demonstrate different voice effects in the acoustic signal.

In other particular cases, the audio demonstration engine 210 applies one or more filters to the acoustic signal associated with the user's speech. In some cases, the filter(s) have specific frequency bands for voice signals, so as to enhance or diminish the effects of the user's speech on playback at the personal audio device 10. Description of this filtering approach is included in U.S. patent application Ser. No. 15/627,905 and U.S. patent application Ser. No. 15/463,368, each of which is previously incorporated herein by reference in its entirety.

After applying the acoustic settings to the detected acoustic signals associated with the user's speech, the audio demonstration engine 210 is configured to output the acoustic signal associated with the user's speech for playback to the user 225 at the personal audio device 10, e.g., at transducers 28 on the personal audio device 10.

In additional implementations, the audio demonstration engine 210 can be configured to provide A/B comparisons of processing performed with and without demonstrated functions. Such A/B comparisons can be used in voice pick-up demonstration mode, CNC mode, ANR mode, etc. In various implementations, the audio demonstration engine 210 is configured to play back recorded feeds of processed audio and unprocessed audio for the user 225 to demonstrate acoustic features of the personal audio device 10. For example, the audio demonstration engine 210 can run two distinct processing approaches simultaneously. In this cases, the first processing approach records unprocessed acoustic signals received at the microphones on the personal audio device 10, e.g., the user's voice, ambient noise signals, etc. The second processing approach records processed acoustic signals as modified by one or more audio setting adjustments described herein (e.g., beamforming algorithm(s) or microphone array directionality/selectivity). In some cases, the audio demonstration engine 210 can separately transmit the two audio files to the separate audio playback device (e.g., smart device 280) for storage and playback at the personal audio device 10. The audio files can be transmitted back to the personal audio device 10, e.g., using custom protocol commands due to single channel audio transmission limitations of certain protocols (e.g., hands-free protocol (HFP)). These audio files can be played back at the personal audio device 10 to demonstrate the differences between the unprocessed versus the processed acoustic signals according to one or more demonstration mode settings.

According to various implementations, the user 225 can experience various demonstrations of audio device capabilities. In some particular implementations, the user 225 can also collect rewards, status or other credentials for completing demonstrations. That is, the audio demonstration engine 210 can be configured to track completed demonstrations for the user 225 and/or other users, and enable a game-style or social media-style credential comparison based upon accomplished demonstrations. For example, the user 225 can receive rewards for completing particular demonstrations using the personal audio device 10 (e.g., early product release/purchase options, credit toward digital media content, early access to tickets for music venues or performers). Additionally, the user 225 can compare his/her "status" in completing a set of demonstration modes versus other users, for example, linked through the profile system 300. The audio demonstration engine 210 can track this status and/or rewards information for the user 225, and may prompt the user 225 to engage in additional demonstration modes to increase his/her status and/or add rewards or other credentials.

Returning to FIG. 2, after presenting the user 225 with the demonstration audio experiences, the audio demonstration engine 210 can be configured to receive feedback from the user 225 about the about each demonstration and/or feature of the personal audio device 10. The audio demonstration engine 210 can include feedback logic 310 for analyzing the feedback from the user 225 about the audio demonstration files. In various implementations, user 225 can provide either a verbal response or a response to a user interface prompt. In particular cases, the feedback can include adjustment of an interface control such as a knob, button, toggle, incremental interface adjustment.

While some examples of feedback are described with respect to a user interface, it is understood that feedback and/or other audio inputs such as sensor data can include an acoustic signal, and may be analyzed using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, audio demonstration engine 210 (and logic therein) can use these acoustic features from feedback or other audio inputs, and metadata features from user adjustments during the demonstration modes, to perform statistical and probabilistic modeling in order to recommend or select audio settings 270 for the user 225 in accordance with other functions.

With continuing reference to FIG. 2, and as noted herein, the audio demonstration engine 210 can include feedback logic 310 for processing feedback received from the user 225, e.g., via one or more interfaces. The feedback logic 310 can be connected with settings lookup/adjustment logic 320, as well as sensor data processing logic 330, and can provide feedback, e.g., to the settings lookup/adjustment logic 320 for use in adjusting the settings 270 on the personal audio device 10. The sensor data processing logic 330 can also provide sensor data to the settings lookup/adjustment logic 320 for use in adjusting the settings 270 on the personal audio device 10. In some cases, feedback logic 310 can be configured to teach sensor data processing logic 330 and settings lookup/adjustment logic 320 about preferences of user 225, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic 310 can be configured to analyze feedback and enhance future operations of audio demonstration engine 210. It is further understood that feedback logic 310, settings lookup/adjustment logic 320 and/or sensor data processing logic 330 may be interconnected in such a manner that these components act in concert or in reliance upon one another.

The audio demonstration engine 210 is described in some examples as including logic for performing one or more functions. In various implementations, the logic in audio demonstration engine 210 can be continually updated based upon data received from the user 225 (e.g., user selections or commands), sensor data received from the sensor system 36, settings updates (in settings library 260), updates and/or additions to the audio library 240 and/or updates to user profile(s) 290 in the profile system 300.

In some example implementations, audio demonstration engine 210 (e.g., using feedback logic 310, settings lookup/adjustment logic 320 and/or sensor data processing logic 330) is configured to perform one or more of the following logic processes using sensor data, command data and/or other data accessible via profile system 300, smart device 280, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, audio demonstration engine 210 is configured to work in concert with sensor system 36 to continually monitor changes in one or more environmental conditions. In some cases, sensor system 36 may be set in an active mode, such as where a position tracking system pings nearby Wi-Fi networks to triangulate the location of the personal audio device 10, or a microphone (e.g., microphones 18 and/or 24) remains in a "listen" mode for particular ambient sounds. In other implementations, sensor system 36 and audio demonstration engine 210 can be configured in a passive mode, such as where a wireless transceiver detects signals transmitted from nearby transceiver devices or network devices. In still other implementations, distinct sensors in the sensor system 36 can be set in distinct modes for detecting changes in environmental conditions and transmitting updated sensor data to audio demonstration engine 210. For example, some sensors in sensor system 36 can remain in an active mode while audio device 10 is active (e.g., powered on), while other sensors may remain in a passive mode for triggering by an event.

As described herein, user prompts can include an audio prompt provided at the personal audio device 10, and/or a visual prompt or tactile/haptic prompt provided at the personal audio device 10 or a distinct device (e.g., smart device 280). In some cases, an audio prompt can include a phrase such as, "Would you like to experience a demonstration of audio mode X?," or "Respond with a nod or "yes" to experience demo Y," or, "Take action Z to initiate a demonstration mode for your particular location." These are merely examples of audio prompts, and any suitable audio prompt could be used to elicit actuation by the user 225. In other cases, a visual prompt can be provided, e.g., on a smart device 280 or at the audio device 10 (e.g., at a user interface) which indicates that one or more demonstration modes or modifications are available. The visual prompt could include an actuatable button, a text message, a symbol, highlighting/lowlighting, or any other visual indicator capable of display on the audio device 10 and/or the smart device 280. A tactile/haptic prompt can include, e.g., a vibration or change in texture or surface roughness, and can be presented at the audio device 10 and/or smart device 280. This tactile/haptic prompt could be specific to the audio demonstration engine 210, such that the tactile/haptic prompt is a signature which indicates the demonstration mode (e.g., AR mode, voice pickup mode) is available. As the tactile/haptic prompt may provide less information about the underlying content offered, distinct tactile/haptic prompts could be used to reflect priority, e.g., based upon user profile(s) 290 or other settings.

In some particular implementations, actuation of the prompt can be detectable by the audio device 10, and can include a gesture, tactile actuation and/or voice actuation by user 225. For example, user 225 can initiate a head nod or shake to indicate a "yes" or "no" response to a prompt, which is detected using a head tracker in the sensor system 36. In additional implementations, the user 225 can tap a specific surface (e.g., a capacitive touch interface) on the audio device 10 to actuate the prompt, or can tap or otherwise contact any surface of the audio device 10 to initiate a tactile actuation (e.g., via detectable vibration or movement at sensor system 36). In still other implementations, user 225 can speak into a microphone at audio device 10 to actuate the prompt and initiate the personalization functions described herein.

In some other implementations, actuation of the prompt is detectable by the smart device 280, such as by a touch screen, vibrations sensor, microphone or other sensor on the smart device 280. In certain cases, the prompt can be actuated on the audio device 10 and/or the smart device 280, regardless of the source of the prompt. In other implementations, the prompt is only actuatable on the device from which it is presented. Actuation on the smart device 280 can be performed in a similar manner as described with respect to audio device 10, or can be performed in a manner specific to the smart device 280.

The demonstration mode processes described according to various implementations can significantly improve the user experience when compared with conventional approaches, for example, by providing the user with a contextual understanding of the capabilities of the personal audio device 10. The demonstration mode processes described according to various implementations can ease user setup of the personal audio device 10 and improve device engagement during use. Additionally, certain implementations allow the user to personalize audio settings that may otherwise go unnoticed or under-utilized. Because the personal audio device 10 is often used in dynamic settings (travel, commuting, etc.), users can appreciate the various functions of the personal audio device 10 across these settings, in real time.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A wearable audio device comprising:
   an acoustic transducer having a sound-radiating surface for providing an audio output; and
   a control system coupled with the acoustic transducer and a sensor system, the control system configured to:
   receive data about at least one of: an environmental condition proximate the wearable audio device or a biometric state associated with a user of the wearable audio device from the sensor system;
   detect availability of a demonstration mode at the wearable audio system based upon the data about the environmental condition or the biometric state, and demonstration mode settings;
   provide a user prompt to initiate the demonstration mode at the wearable audio device; and
   initiate the demonstration mode in response to actuation of the user prompt at the wearable audio device or another device.

2. The wearable audio device of claim 1, wherein the demonstration mode settings comprise capabilities listings for each of a plurality of acoustic features of the wearable audio device.

3. The wearable audio device of claim 1, wherein the sensor system comprises a location tracking system, wherein the environmental condition comprises a location of the wearable audio device, and wherein the location comprises at least one of: a proximity to a location of interest, movement between locations, a proximity to another audio device in a network of audio devices, or a proximity to a smart device associated with a user distinct from a user of the wearable audio device.

4. The wearable audio device of claim 1, wherein the control system is coupled with a smart device having access to a user profile about a user, wherein the control system is further configured to detect availability of the demonstration mode at the wearable audio device based upon the user profile.

5. The wearable audio device of claim 1, wherein the sensor system comprises a position tracking system, wherein the environmental condition comprises a position of the sensor system.

6. The wearable audio device of claim 5, wherein the position tracking system comprises a head tracking system or a body tracking system for detecting at least one of: acceleration, deceleration, look direction, head movement or body movement of a user of the wearable audio device.

7. The wearable audio device of claim 1, wherein the sensor system comprises a microphone and the environmental condition comprises an ambient acoustic signal.

8. The wearable audio device of claim 7, wherein the control system is configured to analyze the ambient acoustic signal to detect at least one of: a voice of a user in the ambient acoustic signal, a noise level of the ambient acoustic signal or a noise signature of the ambient acoustic signal.

9. The wearable audio device of claim 1, wherein the sensor system comprises a wireless transceiver configured to detect an audio cache proximate the wearable audio device, and the control system is configured to provide a notification about the audio cache in the user prompt to initiate the demonstration mode.

10. The wearable audio device of claim 1, wherein, during the demonstration mode, the control system is configured to:
    detect an acoustic signal at the wearable audio device; and
    apply at least one filter to the detected acoustic signal for playback at the acoustic transducer according to the demonstration mode settings.

11. The wearable audio device of claim 1, further comprising an active noise reduction (ANR) circuit coupled with the acoustic transducer for filtering the audio playback according to the demonstration mode settings.

12. The wearable audio device of claim 11, wherein the ANR circuit comprises a set of controllable noise cancelling (CNC) filters permitting user control of noise cancelling functions at the wearable audio device.

13. The wearable audio device of claim 1, wherein the demonstration mode comprises an augmented reality (AR) demonstration mode, and wherein the control system initiates the demonstration mode by outputting an AR message at the transducer during the demonstration mode.

14. The wearable audio device of claim 1, wherein the demonstration mode comprises a voice pickup demonstration mode, wherein the sensor system detects an acoustic signal comprising a voice signal from a user during the demonstration mode, and wherein the control system is configured to apply at least one filter to the voice signal from the user to provide an audio representation of the filtered voice signal.

15. A computer-implemented method comprising:
    receiving data about at least one of: an environmental condition proximate a wearable audio device or a biometric state associated with a user of the wearable audio device from a sensor system;
    detecting availability of a demonstration mode at the wearable audio device based upon the data about the environmental condition or the biometric state, and demonstration mode settings for the wearable audio device;
    providing a user prompt to initiate the demonstration mode at the wearable audio device; and
    initiating the demonstration mode in response to actuation of the user prompt at the wearable audio device or another device.

16. The computer-implemented method of claim 15, wherein the demonstration mode settings comprise capabilities listings for each of a plurality of acoustic features of the wearable audio device.

17. The computer-implemented method of claim 15, wherein the environmental condition comprises a location of the wearable audio device, and wherein the location comprises at least one of: a proximity to a location of interest, movement between locations, a proximity to another audio device in a network of audio devices, or a proximity to a smart device associated with a user distinct from a user of the wearable audio device.

18. The computer-implemented method of claim 15, further comprising:
receiving user profile data about a user of the wearable audio device, wherein detecting the availability of the demonstration mode at the wearable audio device is based upon the user profile data.

19. The computer-implemented method of claim 15, wherein the environmental condition comprises a position of the wearable audio device, the position measured as position data comprising at least one of: acceleration, deceleration, look direction, head movement or body movement of a user of the wearable audio device.

20. The computer-implemented method of claim 15, wherein the environmental condition comprises an ambient acoustic signal, and wherein the method further comprises:
analyzing the ambient acoustic signal to detect at least one of: a voice of a user in the ambient acoustic signal, a noise level of the ambient acoustic signal or a noise signature of the ambient acoustic signal.

21. The computer-implemented method of claim 15, further comprising:
detecting an audio cache proximate the wearable audio device; and
providing a notification about the audio cache in the user prompt to initiate the demonstration mode.

22. The computer-implemented method of claim 15, wherein, during the demonstration mode, the method further comprises:
detecting an acoustic signal at the wearable audio device; and
applying at least one filter to the detected acoustic signal for playback at the acoustic transducer according to the demonstration mode settings.

23. The computer-implemented method of claim 15, further comprising:
filtering the audio playback according to the demonstration mode settings using an active noise reduction (ANR) circuit, wherein the ANR circuit comprises a set of controllable noise cancelling (CNC) filters permitting user control of noise cancelling functions at the wearable audio device.

24. The computer-implemented method of claim 15, wherein the demonstration mode comprises an augmented reality (AR) demonstration mode, and wherein initiating the demonstration mode comprises outputting an AR message at the transducer during the demonstration mode.

25. The computer-implemented method of claim 15, wherein the demonstration mode comprises a voice pickup demonstration mode, wherein the method further comprises:
detecting an acoustic signal comprising a voice signal from a user during the demonstration mode; and
applying at least one filter to the voice signal from the user to provide an audio representation of the filtered voice signal.

* * * * *